Patented June 6, 1939

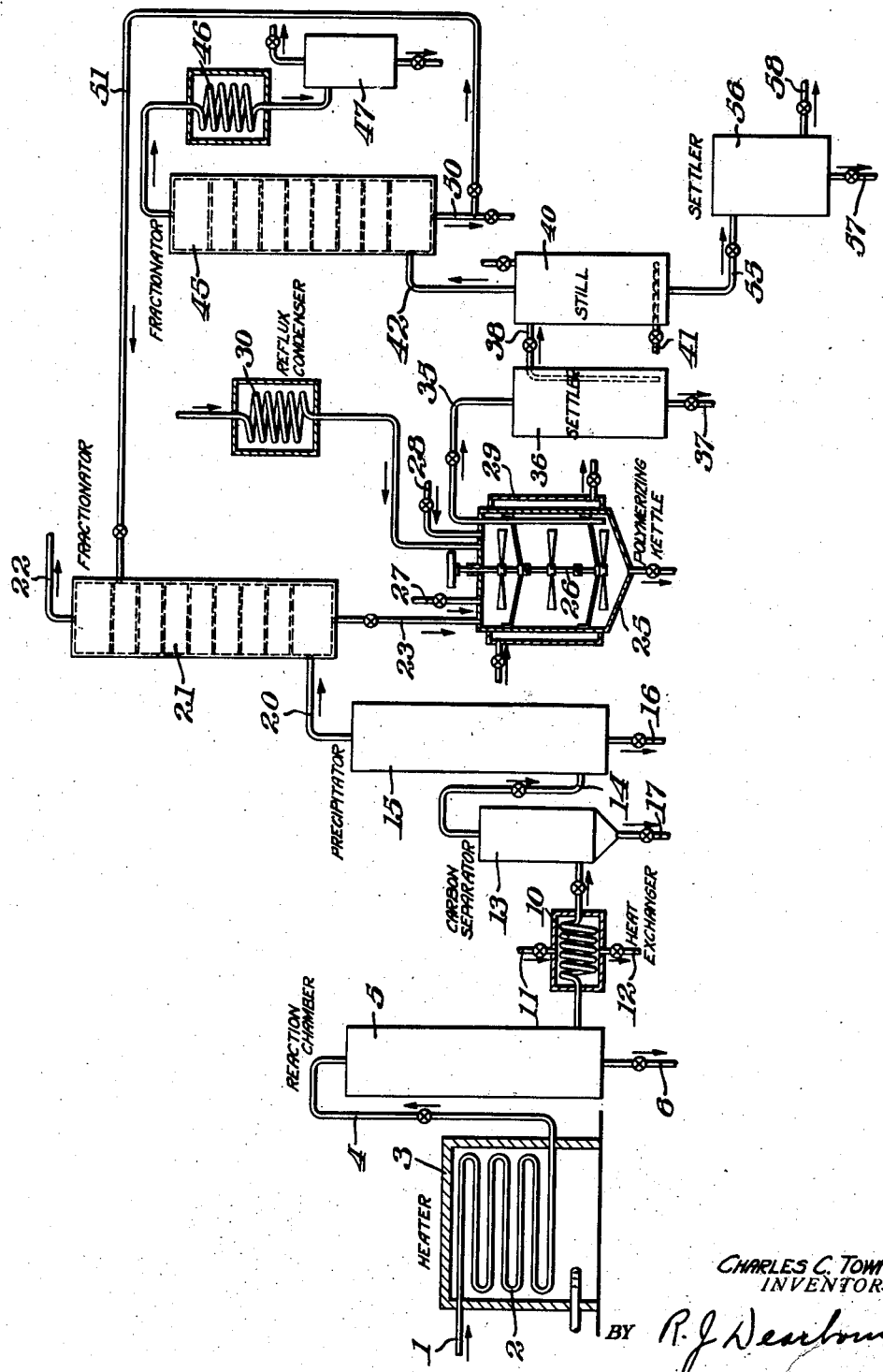

2,161,599

UNITED STATES PATENT OFFICE

2,161,599

PREPARATION OF SYNTHETIC RESINS

Charles C. Towne, Beacon, N. Y., assignor to The Texas Company, New York, N. Y., a corporation of Delaware Application August 14, 1933, Serial No. 684,988

4 Claims. (Cl. 260—82)

This invention relates to the preparation of synthetic resins from petroleum hydrocarbons and has to do particularly with the conversion of liquid hydrocarbons produced in the pyrolysis of normally gaseous hydrocarbons into resinous materials by means of a polymerizing agent of the nature of anhydrous aluminum chloride.

The synthetic resins which have been produced heretofore from petroleum hydrocarbons have consisted of polymerization products of cracked distillates, such as vapor phase cracked naphtha, resulting from the cracking of higher boiling hydrocarbons into lower boiling hydrocarbons. I have found that a new and valuable resin may be prepared in a simple and efficient manner from the liquid products produced by the pyrolysis of gaseous hydrocarbons, such as natural and refinery gases.

According to the present invention natural gas or a fraction thereof containing a large proportion of a saturated constituent, such as propane, is subjected to a high temperature conversion operation in which the gases are rapidly raised to cracking temperatures and then allowed to undergo reactions whereby liquids are formed containing considerable quantities of aromatic hydrocarbons. The composition of the aromatic compounds is not definitely known but it has been determined that they consist of benzol and its homologues and other hydrocarbons which are particularly useful in the preparation of new and useful synthetic resins. The crude liquids from the gas pyrolysis operation may be subjected to a preliminary purification prior to the resin-forming treatment; accordingly, the carbon is preferably separated and the heavy tar precipitated. A naphtha fraction is then recovered and fractionated to produce a raw material suitable for conversion into the resin.

In the resin-forming operation the naphtha is agitated at suitable temperatures with a polymerizing agent. Anhydrous aluminum chloride is preferred for the purpose although other metallic halides, such as iron and zinc chlorides, may be used. In case the concentration of the resin-forming hydrocarbons in the mixture undergoing polymerization is too high, a diluent, such as petroleum naphtha or benzol, may be used. The polymerized products may then be settled and any sludge separated. The latter may be decomposed by aqueous alkali to produce a heavier and inferior grade of resin. The liquid material separated from the sludge contains a superior grade of resin and is treated to recover the same by subjecting the material to treatment with an aqueous alkali or alkali carbonate. I prefer to introduce steam during the reaction to aid in the decomposition of the metallic halide hydrocarbon compounds and also, at the same time, partial distillation of the low boiling hydrocarbons, such as the diluent naphtha and benzol, is effected. By suitable fractionation a substantially pure benzol may be recovered while the heavier constituents, consisting essentially of the naphtha diluent, are separated and may be recycled in the process. The mixture of resin and aqueous alkali and salts is allowed to settle and the resin separated. The resin preferably is allowed to contain a substantial amount of light hydrocarbons or naphtha to render it less viscous.

The resin may be used as such but I prefer to further purify it. A simple means of purification has been found to consist in treating the resinous material with a large quantity of an adsorbent material of the clay type. Ordinary fuller's earth may be used or other agents of like nature, such as bauxite, etc. Enough of the clay may be used to substantially adsorb the resin and the product is thereafter subjected to selective solvent extraction with a series of solvents. I have found that by treating such a mixture successively with naphtha, methyl alcohol and benzol, the oil may be removed first by the naphtha, a purified resin by the methyl alcohol, and a dark resinous or asphaltic material by the benzol. The resin recovered from the methyl alcohol is light colored and fast drying while the material extracted by the benzol is darker and even faster drying.

Reference will now be made to the accompanying drawing in which the single figure shows one form of apparatus for carrying the invention into practice. The drawing is obviously diagrammatic but will serve to further illustrate the invention.

Referring to the drawing, a gas consisting largely of propane, or a mixture of one or more gases, such as methane, ethane, propane and butane, is charged through the line 1 to the heating coil 2 located in a furnace 3. In the heating coil the gases are heated rapidly to a conversion temperature of about 675°–950° C. The time required for the operation is a small fraction of a minute, say in the neighborhood of 0.001 to 0.05 minute. The cracked products are then transferred by a line 4 to a digestion or reaction chamber 5 wherein conversion takes place to liquid products. The temperature maintained in the reaction chamber is usually about the same or a little higher than that specified for the heating coil, and the time is preferably around 0.02 to 0.2 minute. A valved drawoff line 6 is provided at the bottom of the reaction chamber for cleaning purposes or for drawing off liquid products if necessary.

The products from the reaction chamber, after the optimum degree of transformation of cracked hydrocarbons into liquid aromatic compounds has occurred, are passed through a heat exchange coil or cooler 10 wherein heat exchange takes place with a cooling medium, such as fresh charging stock circulated therethrough by the lines 11 and 12. The partially cooled gases are next passed through a carbon separator 13 wherein solid carbonaceous materials are settled out and are removed through a manhole or valved line 17. The cracked products are conducted from the carbon separator by a line 14 to a precipitator 15. The precipitator may be an enlarged chamber provided with cooling wherein partial condensation takes place, but I prefer to use electrical precipitation means. In the precipitator the higher boiling materials of a tarry nature are condensed and separated. It is advantageous, according to the present invention to remove in the precipitator the heavy material, including naphthalene, and if necessary a plurality of separators of like or unlike construction may be employed. The liquids precipitated in the chamber 15 may be withdrawn through the valved drawoff line 16.

The gases and vapors from the precipitator are passed through line 20 to a fractionator 21 wherein the liquefiable products are condensed. While only one fractionator is shown I may use a plurality, if necessary, to obtain the required condensation and fractionation. The dry gases substantially free from liquefiable products are released through the line 22 at the top of the tower and may be returned all or in part to the heating coil 2. The condensate, consisting of a naphtha fraction boiling under 200° C. and preferably having a maximum boiling point of 150° C., is withdrawn from the bottom of the fractionator and passed through the line 23 to a polymerizing chamber or kettle 25.

In the kettle the naphtha is agitated by means of stirring mechanism 26 with anhydrous aluminum chloride which may be introduced as a solid or a hydrocarbon compound through the connection 27. A diluent, such as petroleum naphtha or benzol, which may be recovered in the present process, may be introduced through the line 28 to maintain the proper consistency of the material in the kettle. The materials in the kettle are maintained at a temperature of about 40°–100° C. and preferably at 60°–75° C. by passing a temperature controlling medium through the jacket 29. Low boiling products which may be vaporized in the kettle are condensed and returned to the kettle by means of the reflux condenser 30.

The amount of aluminum chloride used may range from about 1–5% and preferably about 3% by weight. A vigorous reaction occurs and a rise in temperature of about 15°–40° C. may take place. The time of reaction is usually quite short, say around 10–30 minutes, although up to 2 or 3 hours may be required for some products.

The products of reaction are forced by a pump (not shown) through line 35 to a settling chamber 36 wherein the sludge is allowed to settle and be drawn off through line 37. The amount of sludge settling out in chamber 36 is usually small, for example around 3–5% of the mixture.

The sludge may be worked up in a manner to be described hereinafter in connection with the supernatant liquid, to produce a resin which is darker and faster drying than that recovered from the liquid. In some cases it may be advantageous to omit the settling chamber 36 and pass all the products directly to the still 40, referred to hereinafter.

The liquid material substantially free from sludge is transferred through line 38 to a still or decomposing chamber 40. In the still the product is contacted with a sufficient amount of about 10% sodium carbonate solution to effect neutralization of acids and decomposition of aluminum chloride hydrocarbon compounds. Steam may be introduced through line 41 to maintain sufficient temperature to effect the decomposition and also to cause distillation of a portion of low boiling hydrocarbons and diluent. The vapors pass off through line 42 to a fractionator 45 wherein fractionation occurs to produce a vapor fraction consisting essentially of benzol of about 90% grade which may be condensed in condenser 46 and collected in receiver 47. A reflux condensate containing the naphtha or diluent may be drawn off through line 50 and disposed of as desired or recycled to the system through line 51.

The mixture of resinous material and aqueous salt solution is drawn from the still through line 55 to a settling chamber 56 wherein the mixture is allowed to stratify. The aqueous solution is then drawn off through line 57 and the resin through line 58. The resin may be ready for use as withdrawn although mixing with a suitable thinner or drier may be desirable. In case it is desired to obtain a finished product, such as one suitable for use as a protective coating, it is preferable that the material drawn from the line 58 contain about 25% of a thinner which may conveniently be the naphtha contained in the mixture and undistilled in the still 40.

As an example of the operation of the invention a hydrocarbon fraction consisting largely of propane was heated to about 760° C. and then passed through a reaction zone maintained at about 850° C., the reaction time being about 0.1 min. The cracked products were cooled slightly and passed through a carbon separator. The products from the carbon separator were then conducted through an electrical precipitation chamber wherein most of the tars were separated. The vapors were finally subjected to condensation and fractionation whereby a naphtha having a boiling range of about 65°–200° C. was produced.

The naphtha fraction so produced was agitated at a temperature of about 60° C. with about 3% by weight of anhydrous aluminum chloride. The temperature arose to about 80° C. during the reaction which took about 10 minutes. The mixture was allowed to settle and the upper layer was withdrawn from the sludge into a still. An aqueous solution of 10% sodium carbonate in sufficient quantity to effect neutralization was added and the mixture then distilled. About 70% of light oil, based on the original naphtha, consisting largely of benzol, was recovered as a distillate while a mixture of resin and salt solution was allowed to settle and the resin was separated and dehydrated. The yield of resin was about 25% by volume of the mixture used. The sludge separated, as mentioned previously, was decomposed with aqueous alkali and a further quantity of darker and faster drying resin, amounting to about 3%, was recovered.

The resins so produced are light yellow to brown in color, insoluble in isopropyl alcohol, partially soluble in methyl ethyl ketone and in acetone and soluble in benzol and gasoline. They are viscous liquids but dry in thin films in a short time to give a hard transparent surface. It may be possible by more completely removing the light oil constituents to produce a solid resin, if desired. The resin may be dissolved in benzol or naphtha to make a product of any desired consistency.

Obviously many modifications and variations of the invention, as hereinbefore set forth, may be made without departing from the spirit and scope thereof, and therefore only such limitations should be imposed as are indicated in the appended claims.

I claim:

1. The process which comprises subjecting hydrocarbon gases of the class of natural and refinery gases to conversion conditions under temperatures sufficiently high to effect conversion thereof into liquid products containing considerable quantities of aromatic hydrocarbons, treating said liquid products with an anhydrous metallic halide polymerizing agent under such conditions as to produce a synthetic resin.

2. The process which comprises subjecting normally gaseous hydrocarbons to conversion conditions under temperatures sufficiently high to effect conversion thereof into a liquid hydrocarbon distillate containing considerable quantities of aromatic hydrocarbons, fractionating said distillate to obtain a fraction boiling below 200° C., and treating said fraction with anhydrous aluminum chloride under such conditions as to produce a synthetic resin.

3. The process which comprises subjecting normally gaseous hydrocarbons to conversion conditions under temperatures sufficiently high to effect substantial conversion thereof into liquid hydrocarbons containing considerable quantities of aromatic hydrocarbons, treating said liquid hydrocarbons with aluminum chloride under such conditions as to produce a synthetic resin and a purified oil fraction, separating such resin from the oil fraction and recycling at least a portion of the purified oil fraction to said liquid hydrocarbons being treated.

4. The process which comprises subjecting hydrocarbon gases of the class of natural and refinery gases to conversion conditions under temperatures sufficiently high to effect conversion thereof into liquid products containing considerable quantities of aromatic hydrocarbons, separating a liquid distillate from the reaction products, subjecting said distillate containing polymerizable bodies and solvents to the action of aluminum chloride catalyst at temperatures of about 40° to 100° C., to produce a resinous reaction product and separating the resinous product from catalyst and solvents.

CHARLES C. TOWNE.